Patented Jan. 2, 1934

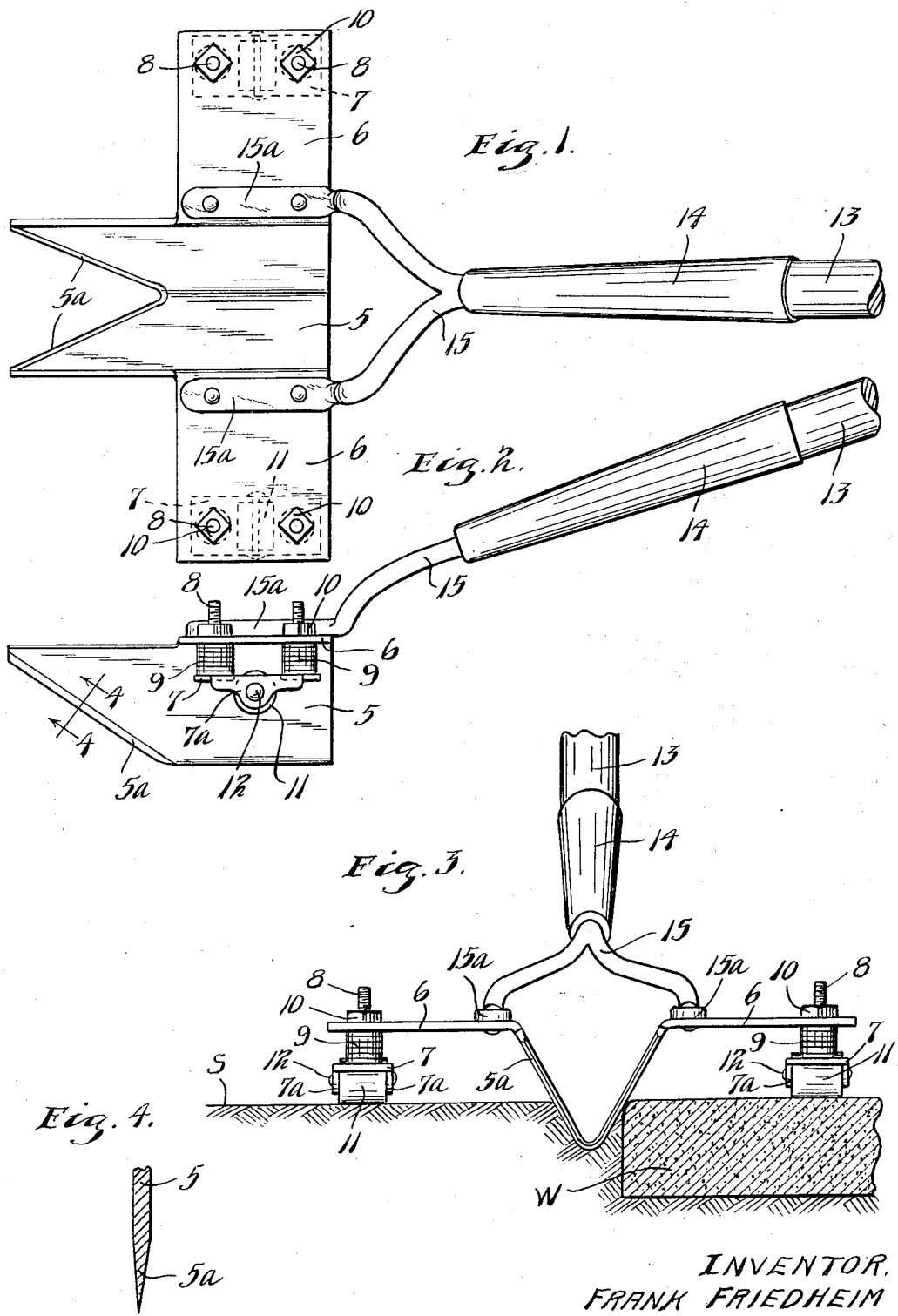

1,941,548

UNITED STATES PATENT OFFICE 1,941,548

LAWN EDGE TRIMMER

Frank Friedheim, Minneapolis, Minn.

Application September 8, 1932. Serial No. 632,099

3 Claims. (Cl. 97—227)

My invention relates to lawn edge trimmers and particularly to devices for grooving the sod adjacent to edges of walks and the like.

It is an object of my invention to provide a novel and improved lawn edge trimmer which is capable of being used to cut a continuous groove of uniform depth and wherein means is provided for adjusting the depth of the cut.

Another object is to provide such a cutter wherein the member having cutting edges thereon is disposed parallel to the direction of travel and wherein the severed strip of sod is delivered directly to the rear of the cutter thus minimizing the force necessary in pushing the cutter and eliminating the possibility of clogging.

Still another object is to provide a cutter of the class described which is supported at each of its respective sides by rollers and wherein each roller is independently vertically adjustable with respect to the cutter.

These and other objects and advantages of the present invention will more fully appear from the following description made in connection with the accompanying drawing, wherein like reference characters refer to the same or similar parts throughout the various views, and, in which, Fig. 1 is a plan view of my invention with a portion of the handle thereof broken away;

Fig. 2 is a side view of my invention with a portion of the handle thereof broken away;

Fig. 3 is a front view with a portion of the handle thereof broken away shown in operating relation to a walk and sod adjacent to the walk; and Fig. 4 is a sectional view of the cutting edge of my invention taken along the line 4—4 of Fig. 2.

Referring to the drawing, there is provided in accordance with the invention a cutter 5, which is V-shaped in transverse vertical cross section, and in the form illustrated, rectangular supporting wings 6 extend respectively outwardly in a horizontal plane from each of the upper edges of the cutter 5 and are formed integrally therewith. The cutter 5 is of course formed of steel plate or other suitable material. Cutter 5 has horizontal and longitudinally disposed upper edges which extend a substantial distance forwardly from the front edges of the wings. The edges 5a of the front end of the cutter 5 respectively slope downwardly and rearwardly from the forwardmost ends of the respective upper edges of the cutter to meet the lowermost portion of the cutter at a point substantially in the same vertical plane as the front edges of the wings 6. Each of the edges 5a is beveled on each side thereof to form a sharpened cutting edge as shown in Fig. 4.

Rectangular plates 7 are located beneath the outer end portions of the wings 6 in parallel relation therebelow. Each of the plates 7 is apertured near its forward and rear ends. Bolts 8 extend upwardly through the apertures of each plate 7, and apertures in the wings 6, and a number of washers 9 are mounted on the bolts 8 between the wings 6 and plates 7. Each of the bolts 8 is tightened in place by a nut 10 as shown. Each of the plates 7 carries a pair of ears 7a depending from opposite sides thereof and formed integrally therewith. Rollers 11 are revolubly mounted on pins 12 supported at their ends in aligned apertures in the ears 7a.

A handle 13, having a ferrule 14 carries at its lower end a forked shank 15, having two spaced, parallel, horizontally disposed, forwardly extending, flat portions 15a which are respectively rivetted, or secured by other suitable means, to the upper surfaces of the innermost portions of the wings 6. The forked shank 15 is so bent that the handle 13 extends upwardly and rearwardly from the flat portions 15a of the forked shank.

Operation

My device as normally used rests upon the rollers 11 and is disposed in a position wherein the cutter 5 is parallel to the ground as shown in Fig. 3. In cutting a groove in the sod S adjacent a walk W, one of the rollers rests upon the walk W and the other on the sod S with one side of the cutter 5 in contact with or close to the edge of the walk. The device is pushed in a direction parallel to the edge of the walk by means of the handle 13 which is situated above and to the rear of the cutter.

The depth of the cut made is adjusted by increasing or decreasing the number of washers 9 associated with each of the bolts 8. If the walk is higher or lower than the sod adjacent thereto, more washers may be used on the bolts 8 associated with one of the rollers 11 than on the bolts associated with the other roller.

It is apparent that the wings are maintained at a definite level with respect to the surfaces of the sod S and the walk W by means of the rollers 11 and hence that the depth of the cut made will be uniform and that no expenditure of energy is necessary for regulating the depth of the cut. Levelling of the cutter 5 longitudinally is easily effected by raising or lowering the handle 13.

Since the cutter 5 is disposed parallel to the direction of travel thereof and the severed strip of sod is delivered directly to the rear of the cutter instead of being pushed upwardly or to one side, it is apparent that a relatively small amount of force is required to propel my device.

Since the cutting edge 5a of the cutter 5 is bevelled on both sides thereof, it is obvious that the sharp forwardmost edge of the cutter will not come in contact with the edge of the walk and hence will not incur the dulling and nicking which would be occasioned by such contact. Also by bevelling the cutter from the inner side as well as the outer side, the cutter acts to cut a path for itself through the sod, whereas if the cutter was bevelled entirely from the outer side it would not cut a path for itself.

It will be obvious that the cutter can be readily sharpened as by a file when it becomes dulled.

Due to the provision of the rollers 11 at each side of the implement and the symmetrical construction of the implement, it will be possible to run the implement in either direction at both sides of a walk and it is therefore possible to run the forwardmost end of the blade of the implement up to a vertical riser such as a porch step at both sides of the walk. In lawn edge trimmers adapted for movement in one direction only at each side of a walk, it is not possible to run the implement close to a riser such as step at each side of the walk because of the rearward projection of the handle of the trimmer.

It is apparent that I have invented a novel and efficient form of lawn edge trimmer which may be operated to maintain a uniform depth of cut, which is adjustable with respect to depth of cut, which may be propelled with a minimum expenditure of energy, which will not clog, and which is simple and inexpensive of manufacture.

It will, of course, be understood that various changes may be made in the form, details, arrangement and proportions of the various parts without departing from the scope of the present invention.

What is claimed is:—

1. A lawn edge trimmer comprising a cutter of V-shape in transverse cross section and adapted for movement in a direction normal to the plane of said cross section, the forward edges of said cutter being sharpened and extending downwardly, inwardly, and rearwardly from the forwardmost and uppermost corners of said cutter to meet at a point on the lowermost portion of the cutter, a supporting roller revolubly mounted with respect to said cutter and a handle secured to said cutter.

2. A lawn edge trimmer comprising a horizontally disposed cutter of V-shape in vertical transverse cross-section, said cutter terminating at its forward edge in a plane inclined at a substantial angle upwardly and forwardly from the apex of said cutter, the forward edge of said cutter being sharpened, said cutter having integral supporting wings extending outwardly from its upper edges, a pair of rollers respectively located beneath and connected to said wings, said rollers being revolubly mounted with their axes parallel, means for individually and adjustably varying the vertical distances between the bottoms of the respective rollers and the bottom of said blade, a forked member secured to said wings, and a handle secured to said member and extending upwardly and rearwardly therefrom.

3. A lawn edge trimmer comprising a cutter of V-shape in transverse cross section, the forward edges of said cutter being sharpened and extending diagonally downwardly and rearwardly from upper tips to meet at a common point on the lowermost portion of the cutter, rollers revolubly carried by the cutter at the sides thereof and supporting the same, means for varying the height of said rollers relative to said cutter to vary the depth of cut of the same, and a handle secured to said cutter.

FRANK FRIEDHEIM.